United States Patent
Sandri et al.

(10) Patent No.: US 10,850,598 B2
(45) Date of Patent: Dec. 1, 2020

(54) ELASTIC DEVICE OF A MOTOR-VEHICLE ENGINE SUSPENSION

(71) Applicant: C.R.F. Società Consortile per Azioni, Orbassano (IT)

(72) Inventors: Silvano Sandri, Saluzzo (IT); Michele Rabito Crescimanno, Sangano (IT)

(73) Assignee: C.R.F. Societá Consortile per Azioni, Orbassano (IT)

( * ) Notice: Subject to any disclaimer, the term of this patent is extended or adjusted under 35 U.S.C. 154(b) by 52 days.

(21) Appl. No.: 16/213,344

(22) Filed: Dec. 7, 2018

(65) Prior Publication Data

US 2019/0176604 A1    Jun. 13, 2019

(30) Foreign Application Priority Data

Dec. 12, 2017    (EP) .................................... 17206607

(51) Int. Cl.
| | |
|---|---|
| *F16F 3/00* | (2006.01) |
| *B60K 5/12* | (2006.01) |
| *F16F 3/12* | (2006.01) |
| *F16F 1/02* | (2006.01) |

(52) U.S. Cl.
CPC ............ *B60K 5/1208* (2013.01); *F16F 1/025* (2013.01); *F16F 3/12* (2013.01); *B60K 5/1241* (2013.01); *B60K 5/1291* (2013.01); *F16F 2224/025* (2013.01); *F16F 2224/0208* (2013.01)

(58) Field of Classification Search
CPC .. F16F 1/02; F16F 1/025; F16F 1/3849; F16F 15/022; F16F 2234/06; B60K 5/1241; B60K 5/1275; B60K 5/1208
See application file for complete search history.

(56) References Cited

U.S. PATENT DOCUMENTS

| | | | | |
|---|---|---|---|---|
| 1,433,201 A | * | 10/1922 | Grant .................... | B60R 19/285 293/102 |
| 1,735,899 A | | 11/1929 | Henry | |
| 1,770,644 A | * | 7/1930 | Hartog .................... | F16C 7/023 74/579 E |
| 2,063,216 A | * | 12/1936 | Zaparka ................. | B60G 11/34 267/30 |
| 2,878,013 A | | 3/1959 | Piodi | |

(Continued)

FOREIGN PATENT DOCUMENTS

| | | |
|---|---|---|
| DE | 1077540 | 2/1958 |
| EP | 0132048 A1 | 1/1985 |

(Continued)

OTHER PUBLICATIONS

Search Report for European Application No. 17206607.8 dated Sep. 21, 2018.

*Primary Examiner* — Nicholas J Lane
(74) *Attorney, Agent, or Firm* — Heslin Rothenberg Farley & Mesiti P.C.; Victor A. Cardona, Esq.

(57) ABSTRACT

A motor-vehicle engine suspension elastic device has a main body of metal and/or composite material elongated in a direction parallel to the longitudinal direction of the motor-vehicle. The elastic device has a first end that can be connected to a structural connecting element of a motor-vehicle, and a second end that can be connected to a motor-vehicle engine. The main metal body of the elastic device includes at least one portion elastically deformable in the aforesaid longitudinal direction.

17 Claims, 11 Drawing Sheets

(56) References Cited

U.S. PATENT DOCUMENTS

Figure 1:
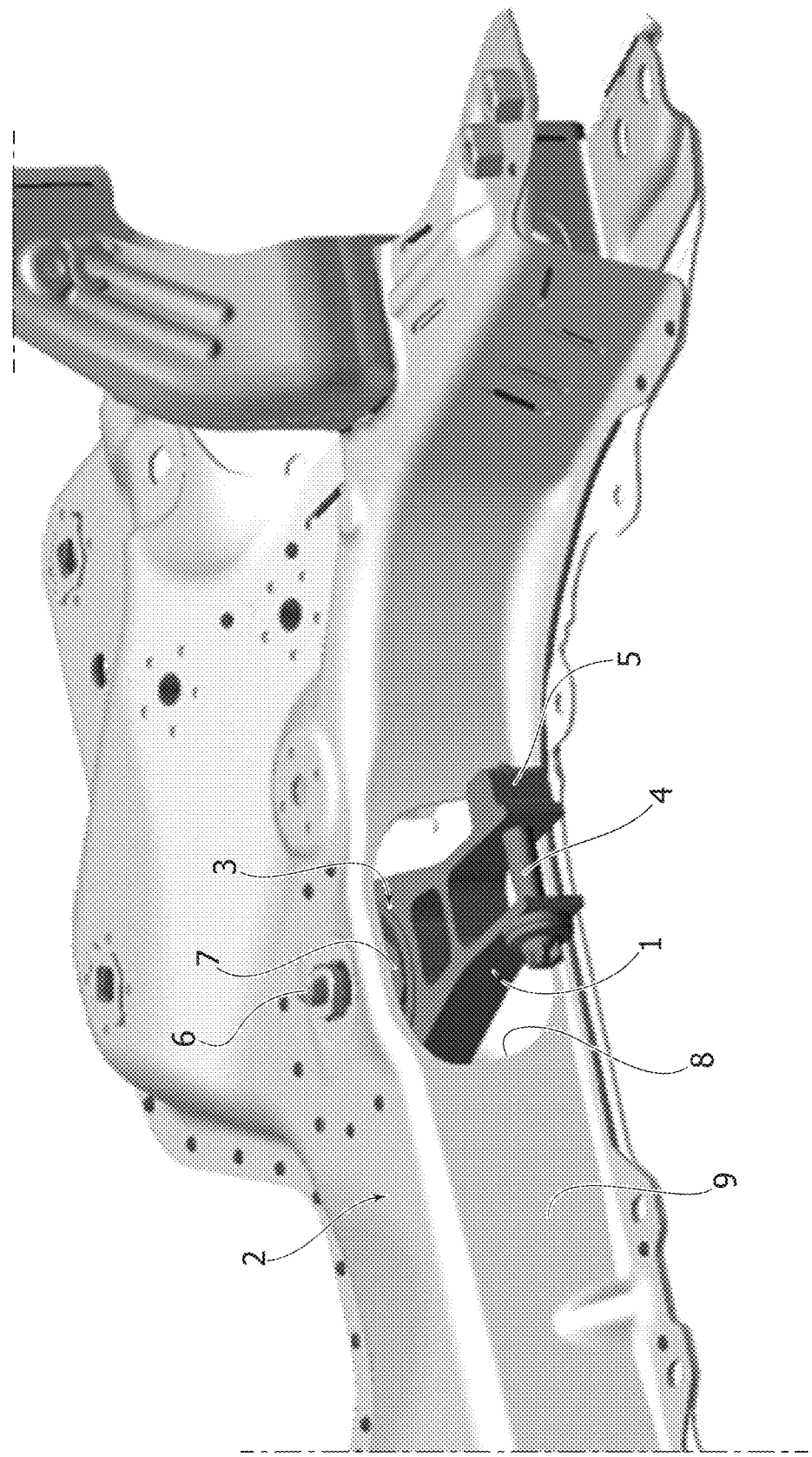

| | | | | | |
|---|---|---|---|---|---|
| 3,737,155 | A | * | 6/1973 | Karlan | F16F 1/027 267/136 |
| 4,832,320 | A | * | 5/1989 | Scowen | B60G 15/06 267/148 |
| 4,901,814 | A | * | 2/1990 | von Broock | F02B 75/22 180/297 |
| 4,927,124 | A | * | 5/1990 | Spedding | B60G 11/00 267/149 |
| 5,160,121 | A | * | 11/1992 | Bartholomew | F16F 1/371 267/136 |
| 5,197,698 | A | * | 3/1993 | Bartholomew | B60K 13/04 180/309 |
| 5,271,611 | A | * | 12/1993 | Noe | B60K 5/1208 267/158 |
| 6,629,688 | B1 | * | 10/2003 | Sebert | F16F 1/02 267/147 |
| 2009/0200721 | A1 | * | 8/2009 | Kobelev | B60G 11/00 267/195 |
| 2009/0267391 | A1 | * | 10/2009 | Honnorat | F16F 1/025 297/216.17 |

FOREIGN PATENT DOCUMENTS

| | | | |
|---|---|---|---|
| GB | 1574037 A | * | 9/1980 |
| WO | 0242661 A1 | | 5/2002 |

* cited by examiner

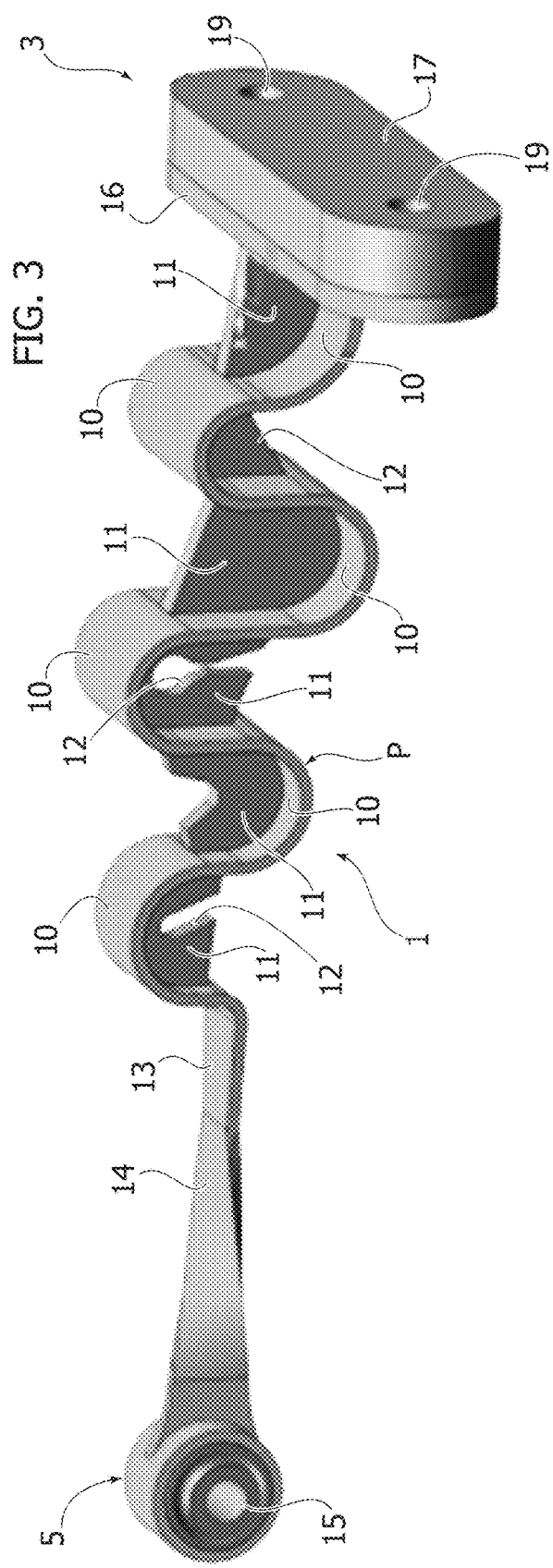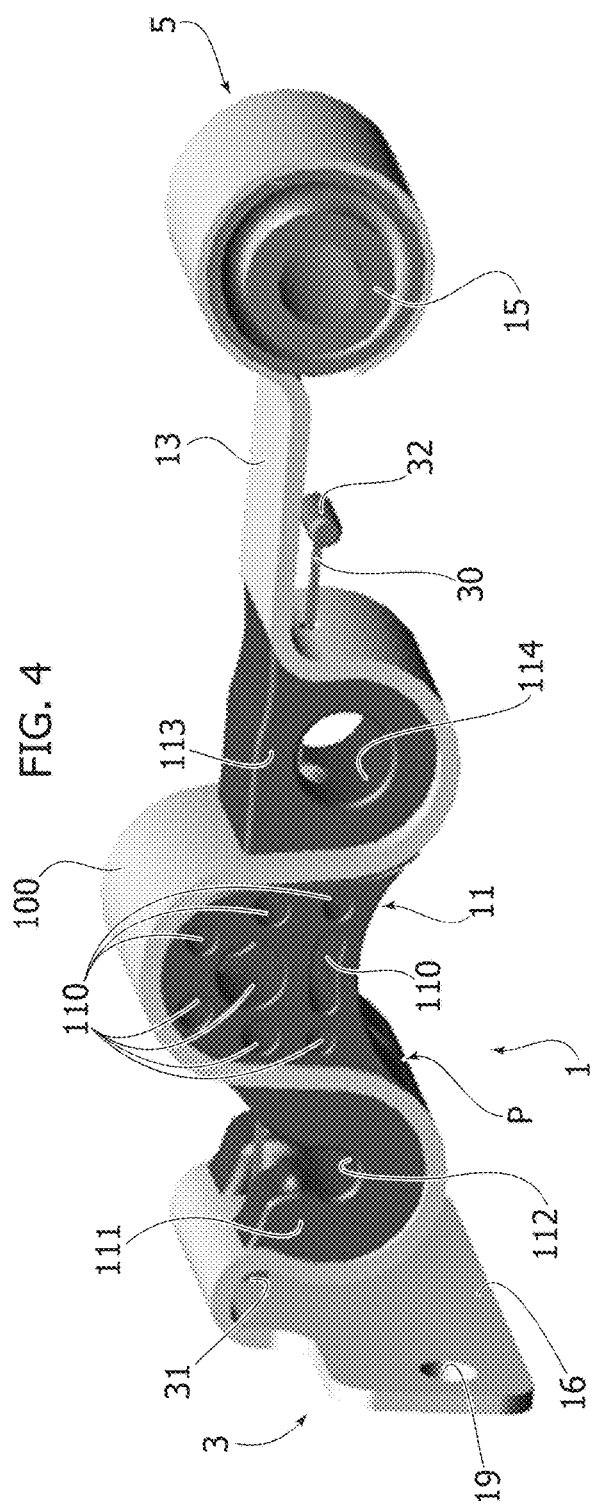

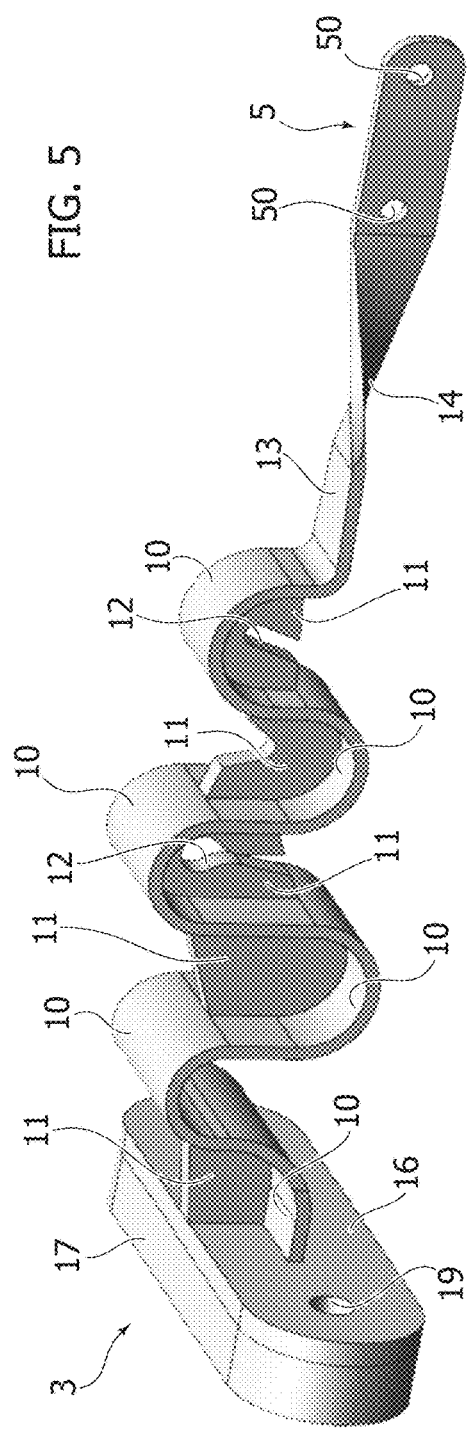
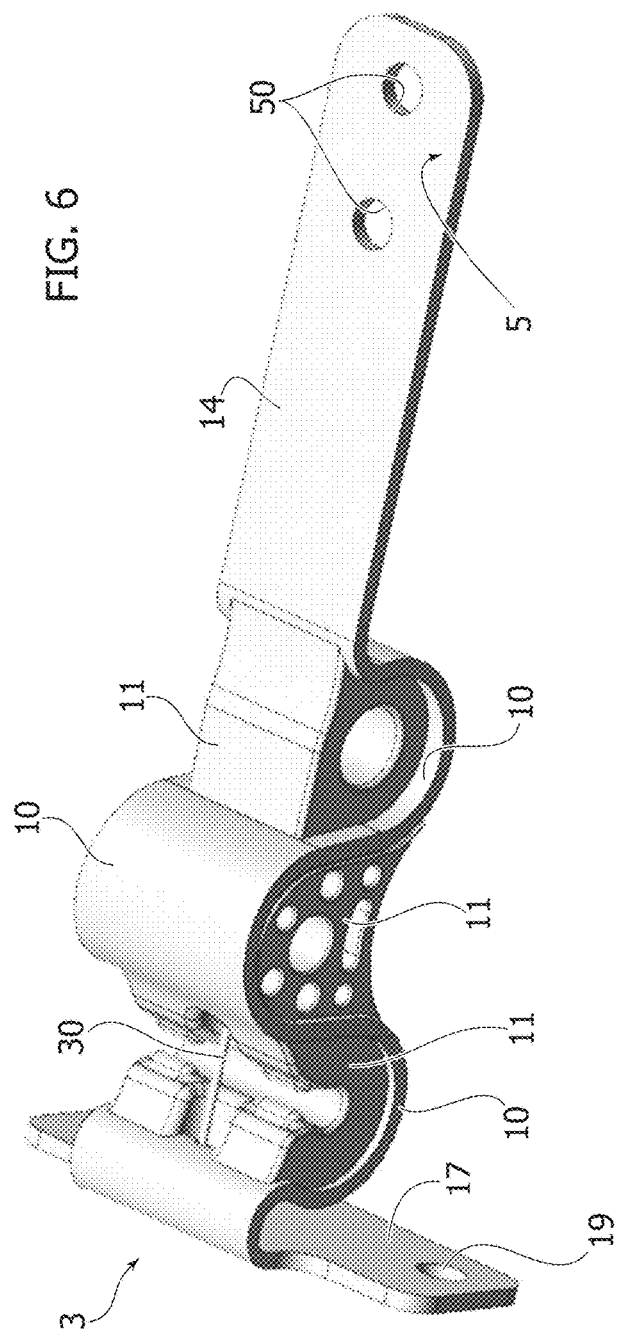

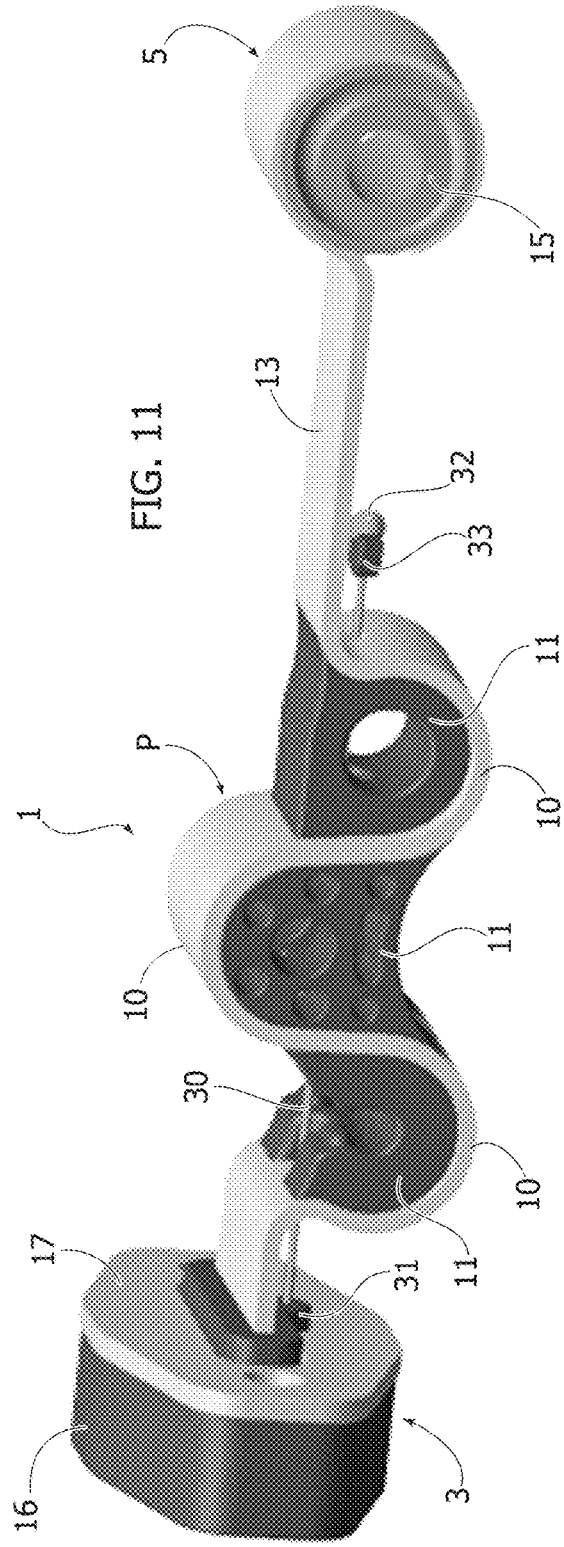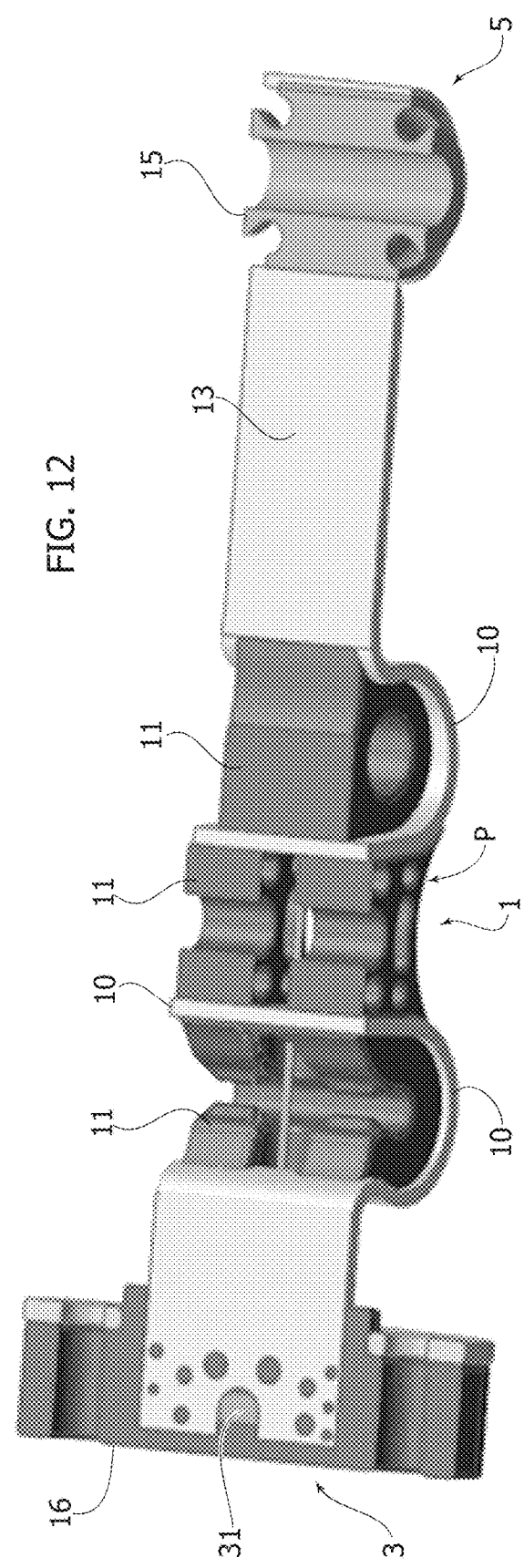

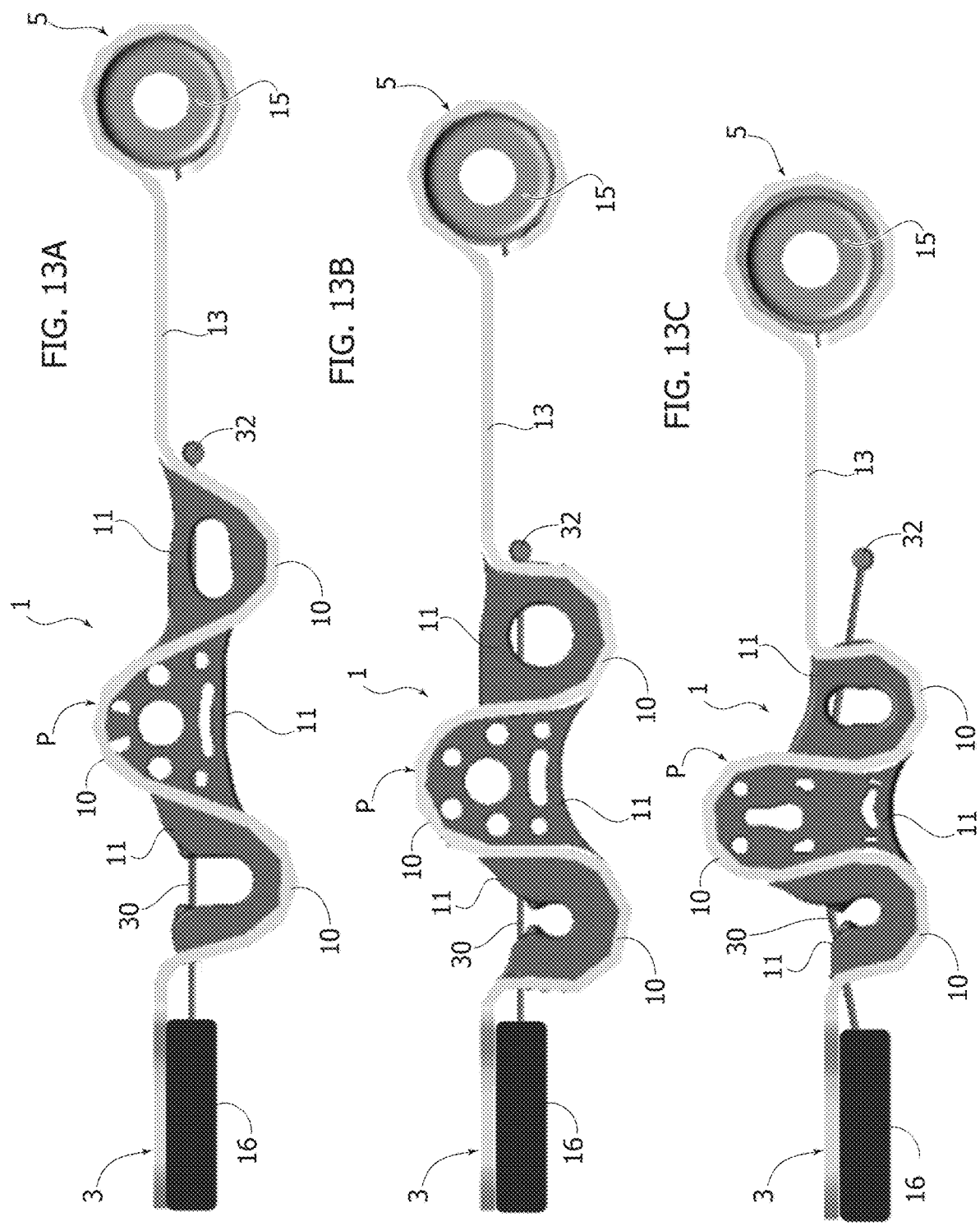

ELASTIC DEVICE OF A MOTOR-VEHICLE ENGINE SUSPENSION

FIELD OF THE INVENTION

The present invention relates in general to motor-vehicle engine suspensions, and specifically to a motor-vehicle engine suspension elastic device having a main body of metal and/or composite material substantially elongated in a direction substantially parallel to the longitudinal direction of said motor-vehicle, said elastic device having a first and a second end, wherein said first end can be connected to a structural connecting element of a motor-vehicle, and a second end can be connected to said engine of said motor-vehicle.

PRIOR ART

Elastic devices of the type indicated above are arranged on board motor-vehicles to counter the stresses of the motor-vehicle engine, in particular, the stresses generated in the longitudinal direction, during its operating steps. Thanks to their conformation, these elastic devices are designed to reduce the perception of these stresses by a motor-vehicle user. Moreover, these types of elastic devices cooperate with upper elastic dowels for stabilizing and containing the engine assembly inside the engine compartment.

Elastic devices of the type indicated above, known to date, have a body of metal and/or composite material elongated in a direction substantially parallel to the longitudinal direction of the motor-vehicle. The elongated body has two opposite ends, in which a first end is intended to be connected to a structural connecting element fixed to the motor-vehicle floor, and a second end is intended to be connected to the motor-vehicle engine.

At one or both ends of the elastic device, an elastic bushing of elastomeric material is included. The elastic bushings of elastomeric material are preferably designed to work in tension and compression as a result of the longitudinal stresses to which the device is subjected, so as to dampen these stresses.

Typically, elastic devices of this type and, in particular, the elastic bushings provided at the ends of the body of metal and/or composite material, are subject to durability issues during the operative life of the motor-vehicle. These durability issues can occur through excessive wear of the elastic bushing, which causes deterioration in performance of the elastic device and consequent problems of acoustic comfort for the motor-vehicle user.

Furthermore, as a result of excessive wear of the elastic bushings, breaking of the metal and/or composite body of the elastic device may also occur.

Furthermore, malfunctions of the elastic device can cause wear of the upper elastic dowels that support the engine.

OBJECT OF THE INVENTION

The object of the present invention is to produce an elastic device of the type indicated at the beginning of the present description that overcomes the disadvantages described above, and improves performances of durability and filtering of the perceived stresses with respect to known devices.

A further object of the present invention is to provide an elastic device that can be simply and economically constructed, which works to effectively absorb the aforesaid stresses and that is easily adaptable to different types of motor-vehicle.

SUMMARY OF THE INVENTION

In view of achieving these objects, the invention relates to an elastic device having the characteristics indicated at the beginning of the present description and also characterized in that said main body of metal and/or composite material includes at least one elastically deformable portion in said longitudinal direction and said at least one elastically deformable portion has a serpentine wavy conformation.

Thanks to this characteristic, with respect to known elastic devices, the main body of metal and/or composite material of the elastic device also acts as a filtering element that works in tension and compression, together with one or more bushings of elastomeric material, to dampen the oscillations caused by shaking of the engine.

In one embodiment of the invention, the aforesaid elastically serpentine wavy conformation defines a plurality of loops with concavities alternately facing in opposite directions. This wavy conformation can have different widths and thicknesses, in order to obtain different rigidities of the device according to the required use. The term width means a dimension extending in a direction substantially transverse to the aforesaid longitudinal direction. Still according to this embodiment, one or more elements of elastomeric material—with elastic and shock-absorbing functions—are associated with the elastically deformable portion of the main body of metal and/or composite material.

Still referring to the case of the aforesaid embodiment, a seat is provided at the second end of the elastic device, which is designed to receive an elastic bushing of elastomeric material, having a main axis directed in a direction substantially transverse to the longitudinal direction.

At the first end, the elastic device can have another seat for receiving a respective elastic bushing, having a main axis directed in a direction transverse to the longitudinal direction of the elastic device.

Alternatively, the aforesaid first end can comprise a plate of metal and/or composite material having a main plane substantially perpendicular to the longitudinal direction.

Alternatively, the aforesaid first end can comprise a plate having a main plane substantially parallel to the longitudinal direction.

According to another preferred characteristic of the invention, the elastic device also comprises a tension cable extending along the main body of the device and passing through the aforesaid loops and the aforesaid elements of elastomeric material. The cable has a first cable end connected at said first end and a free second cable end including a stroke-end element of elastomeric material to limit the elastic deformation of the main body of metal and/or composite material.

DETAILED DESCRIPTION OF THE INVENTION

Figure 2:
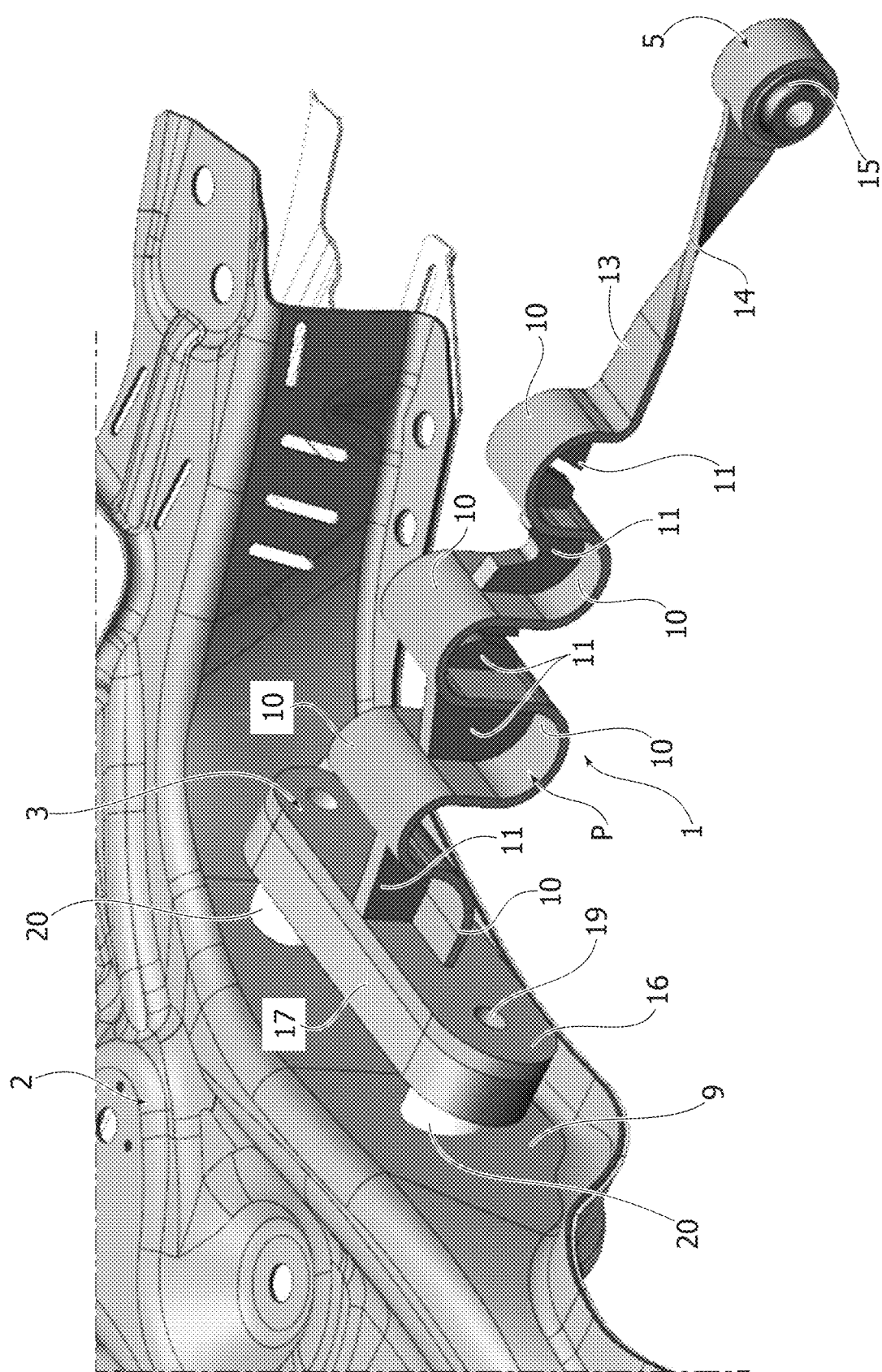
Figure 7:
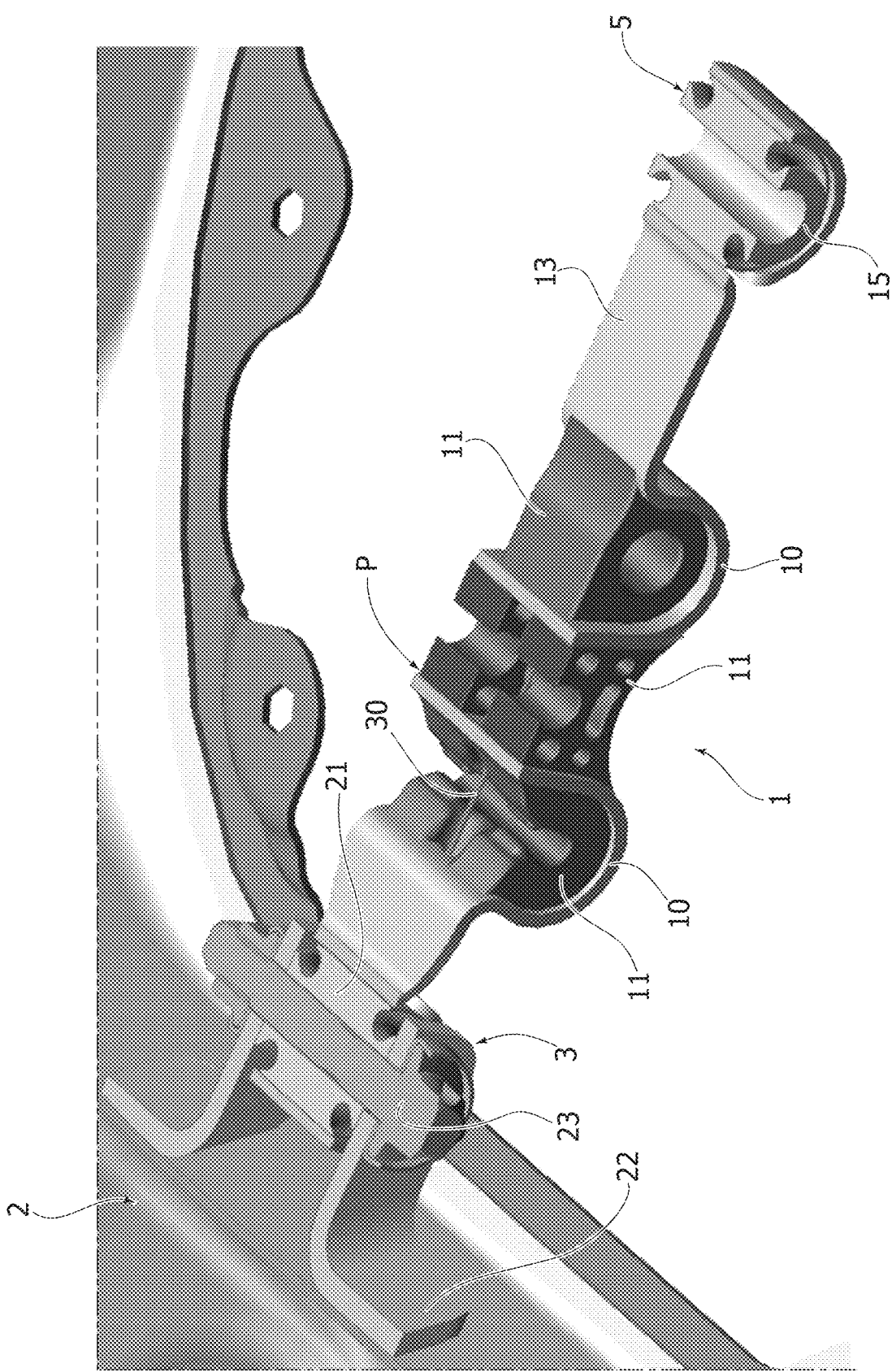
Figure 8:
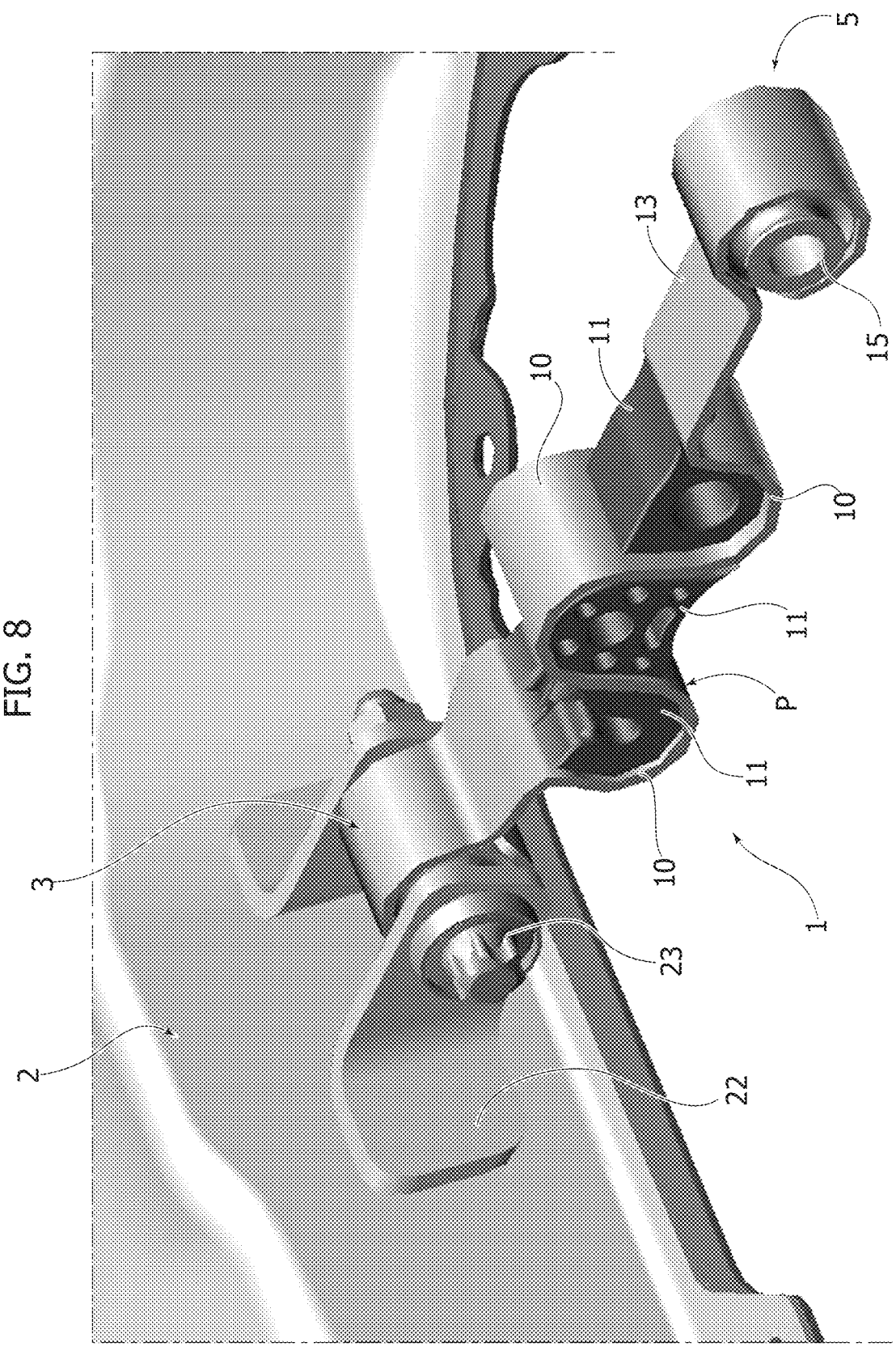
Figure 9:
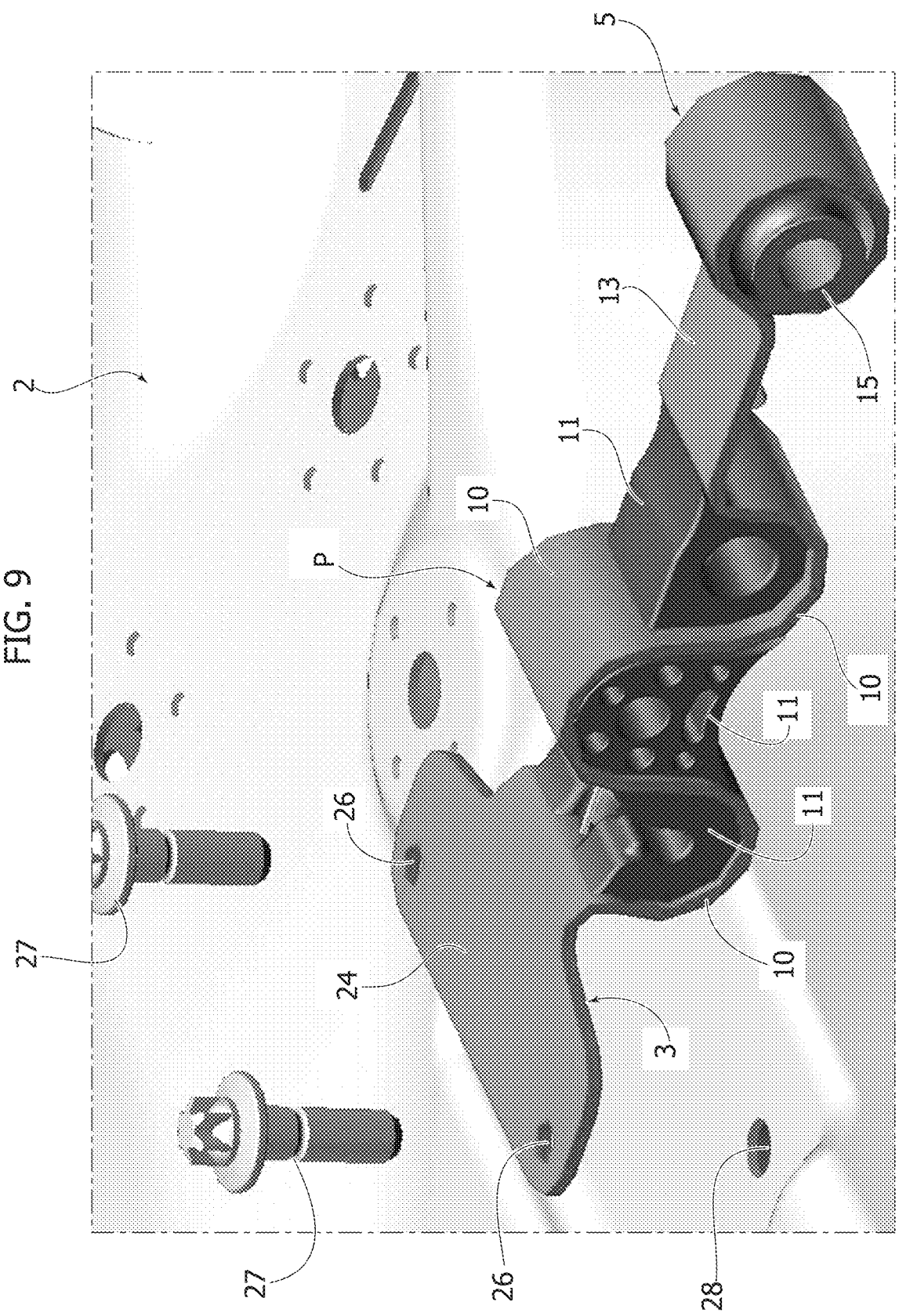
Figure 10:
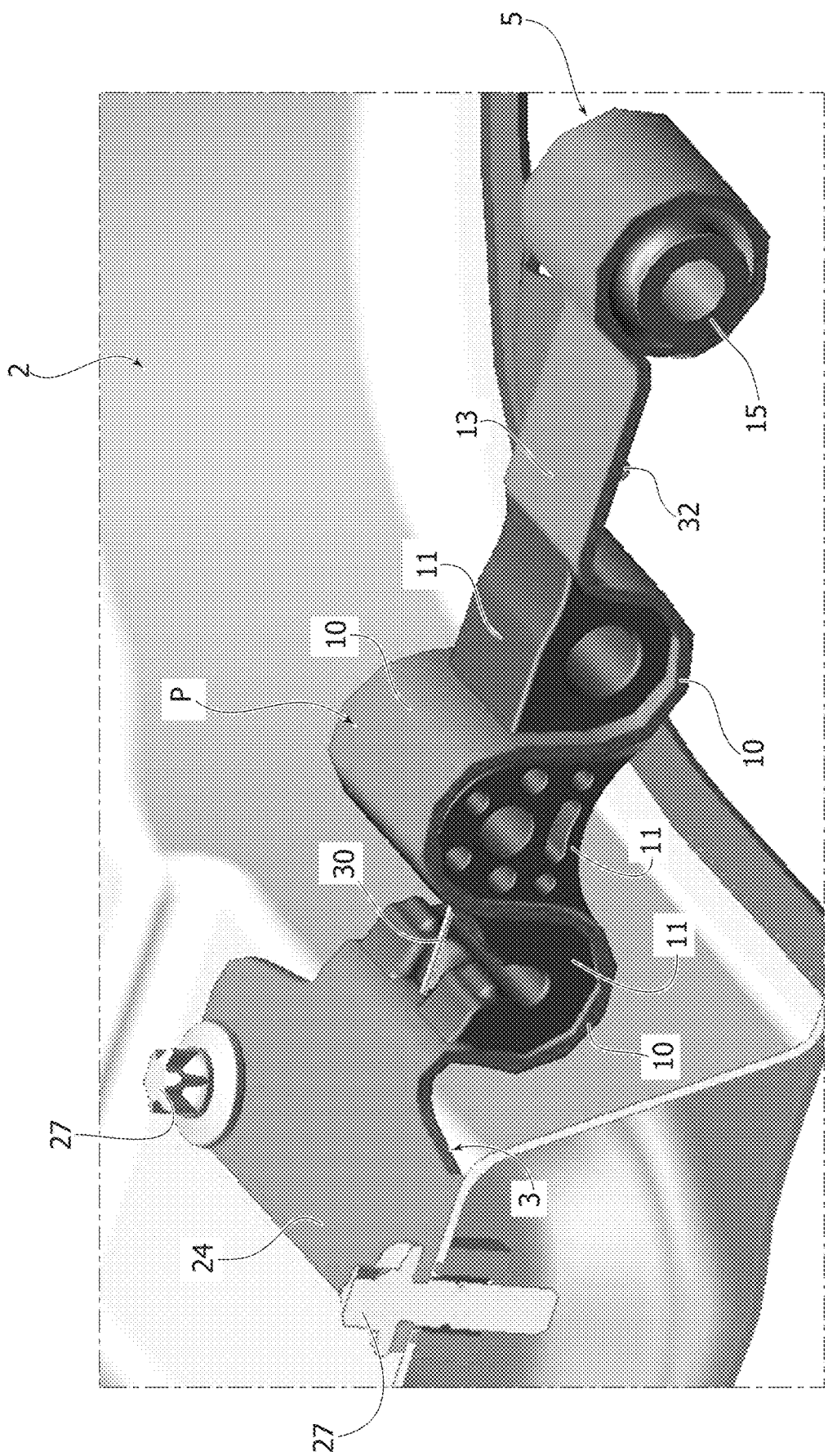
Figure 14:
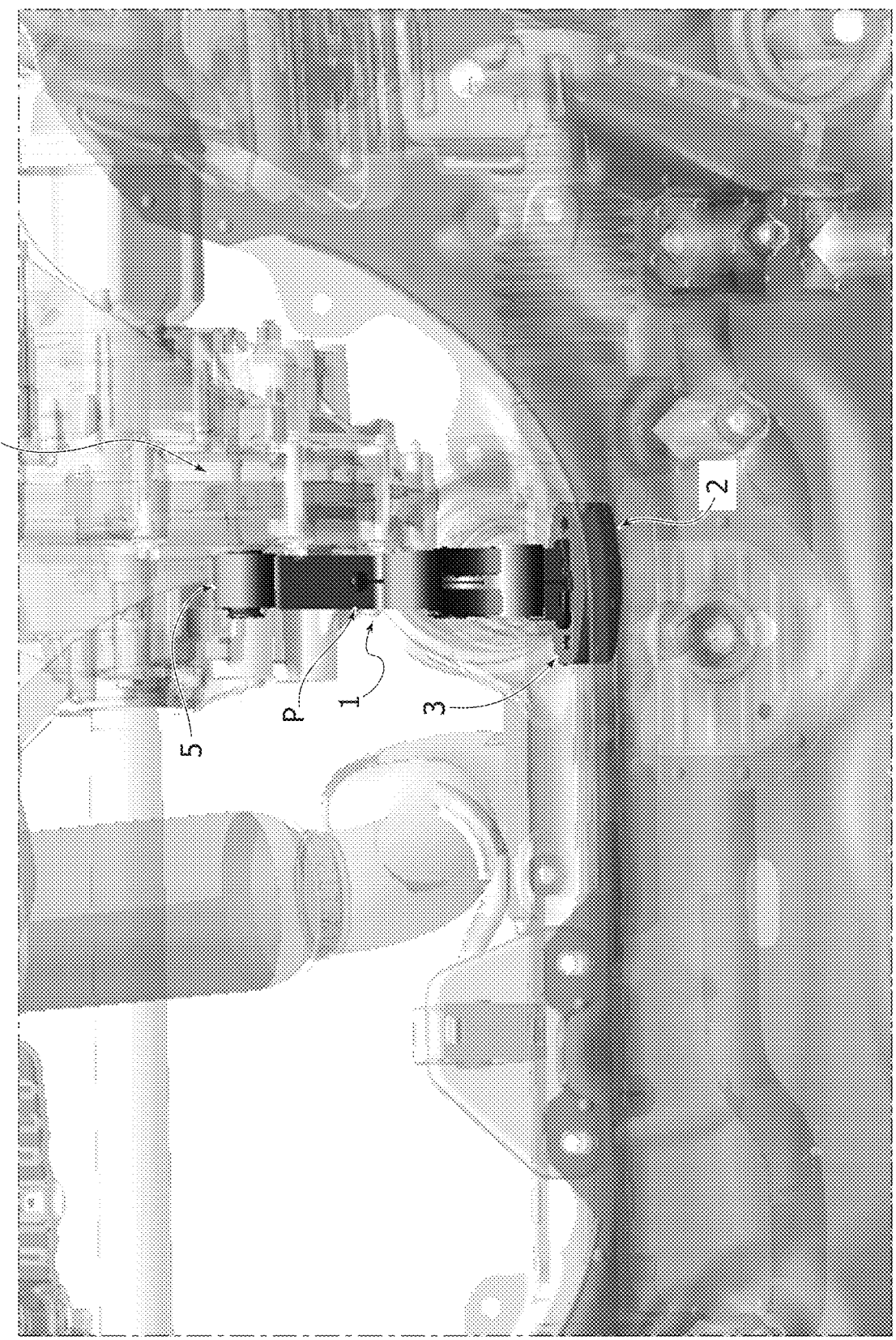

Further characteristics and advantages of the invention will become apparent from the description that follows with reference to the attached drawings, provided purely by way of non-limiting example, wherein:

FIG. 1 is a perspective view of a known-type of elastic device connected to a structural connecting element of a motor-vehicle, FIG. 2 illustrates a perspective view of a first embodiment of an elastic device according to the present invention connected to a structural connecting element of a motor-vehicle, FIG. 3 illustrates a perspective view of the elastic device of the preceding Figure, FIG. 4 illustrates a perspective view of a second embodiment of an elastic device according to the present invention, FIGS. 5 and 6 illustrate, respectively, a perspective view of a third and a fourth embodiment of an elastic device according to the present invention, FIGS. 7 and 8 illustrate, respectively, a perspective view and a cross-sectional perspective view of a fifth embodiment of an elastic device according to the present invention connected to a structural connecting element of a motor-vehicle, FIGS. 9 and 10 illustrate, respectively, an exploded perspective view and a partially sectioned perspective view of a sixth embodiment of an elastic device according to the present invention connected to a structural connecting element of a motor-vehicle, FIGS. 11 and 12 illustrate, respectively, a perspective view and a cross-sectional view along the longitudinal direction of a seventh embodiment of an elastic device according to the present invention, FIGS. 13A-13C illustrate respective schematic views of the device illustrated in FIGS. 9 and 10 during its operating steps, and FIG. 14 illustrates a perspective view of the elastic device illustrated in FIGS. 11 and 12 connected to a structural connecting element of a motor-vehicle and to an engine of a motor-vehicle.

In the following description, various specific details are illustrated aimed at a thorough understanding of the embodiments. The embodiments can be implemented without one or more of the specific details, or with other methods, components, materials, etc. In other cases, known structures, constructive details, materials or operations are not illustrated and described in detail, since they can be produced in any known way, and also because they do not fall within the scope of the present invention.

FIG. 1 illustrates an elastic device of a motor-vehicle suspension of the conventional type. The elastic device has a main body 1 of metal and/or composite material substantially elongated in a direction parallel to the longitudinal direction of a motor-vehicle. The elastic device has a first end 3 connected to a structural connecting element 2 of a motor-vehicle, and a second end 5, which can be connected to a motor-vehicle engine not illustrated in FIG. 1.

At the second end 5, a threaded connection 4 is illustrated, intended to connect the main body 1 of the elastic device to a bracket rigidly connected to the engine of the motor-vehicle (not illustrated in the drawings). At the first end 5, the elastic device has an elastic bushing 7 of elastomeric material. The first end 5 of the elastic device is connected to an upper wall of the structural connecting element 2 by means of a threaded connection 6. Still with reference to FIG. 1, the first end 5 of the conventional elastic device is arranged within an opening 8 formed at a vertical wall 9 of the structural connecting element 2.

As already indicated above, the elastic device illustrated in FIG. 1, and in particular the elastic bushing 7, is subject to durability issues during the operative life of the motor-vehicle. The wear of the device can completely affect the intended function of the elastic device on board the motor-vehicle, that is, of attenuating the stresses deriving from shaking of the engine during the operating steps. As a result of excessive wear of the elastic bushing 7, can also occur breaking of the body of metal and/or composite material 1 of the elastic device.

Moreover, another drawback of the known configuration illustrated in FIG. 1 derives from the provision of the opening 8 at the wall 9 of the structural connecting element 2, since this opening 8 reduces the rigidity and the acoustic comfort performance (noise, vibrations, harshness—NVH) of the structural connecting element 2 of the motor-vehicle.

In order to overcome the aforesaid drawbacks, a fundamental characteristic of the invention lies in the fact in that the main body 1 of the elastic device according to the invention includes at least one portion P elastically deformable in the longitudinal direction in which the elastic device extends.

In FIGS. 3-14, the parts common to those of FIG. 1 are indicated by the same reference numbers.

In the drawings, according to a concrete embodiment of the device according to the invention, the main body 1 is made of steel and the aforesaid elastically deformable portion P has a serpentine wavy conformation defining a plurality of loops 10 with concavities alternately alternating in opposite directions.

According to an important characteristic of the invention, at the elastically deformable portion P of the main body 1, and specifically at the loops 10, one or more elements of elastomeric material 11 are arranged, which have elastic and shock-absorbing functions.

In particular with reference to FIGS. 3 and 11, illustrating two alternative embodiments of the invention, the elements of elastomeric material 11 each have at least one hollow portion 12. These hollow portions 12 are formed at the elements of elastomeric material 11, both to lighten the elastic device and to modulate the elongation stiffness of the device according to the number and extension of the hollow portions 12. As illustrated, for example, in FIG. 3, the hollow portions 12 of each element of elastomeric material 11 can be produced in the form of slots. As illustrated, for example, in FIG. 4, the hollow portions 12 can be made in the form of a single hole, a plurality of smaller-sized holes, or a slot.

According to a method known per se, the elements of elastomeric material 11 are vulcanized to the respective loops 10 of the serpentine portion P of the metal body 1 of the elastic device according to the present invention. Of course, the elements 11 can also be formed without hollow portions 12.

With reference to the embodiments of the attached drawings, the body of metal and/or composite material 1 of the elastic device according to the present invention can be produced with a different number of loops 10, and also a different conformation of the elements of elastomeric material 11, depending on the type of motor-vehicle and engine on which the device is installed. The wavy conformation of the body 1 can have different widths and thicknesses, in order to obtain different rigidities of the device according to the required use.

In a completely similar way to the known type of device, the elastic device according to the invention has a first end 3 that can be connected to a structural connecting element 2 of a motor-vehicle, and a second end 5 that can be connected to a motor-vehicle engine M (FIG. 14).

According to alternative embodiments of the invention illustrated in the attached drawings, the elastic device can be made in different ways at its ends 3, 5 according to the type of motor-vehicle and engine with which the device is associated (FIGS. 5 and 6).

FIGS. 2-3 illustrate a first embodiment of an elastic device according to the present invention. In this embodiment, the main body 1 in the portion comprised between the second end 5 and the elastically deformable portion P, with serpentine wavy conformation, is in the form of a band 13. The band 13 has a twisted portion 14 to allow stress absorption in a direction transverse to the longitudinal direction of the motor-vehicle.

At the second end 5 of the device, intended to be connected to the engine of the motor-vehicle, a seat is arranged for receiving an elastic bushing 15 of elastomeric material, having a main axis directed in a direction substantially transverse to the longitudinal direction of the motor-vehicle and of the elastic device.

Another embodiment of an elastic device according to the present invention is illustrated in FIG. 5. In a manner completely similar to that described above, the main body 1 in the portion comprised between the second end 5 and the elastically deformable portion P, with a serpentine wavy conformation, is in the form of a band 13 with a twisted portion 14. At the second end 5 of the device, intended to be connected to the engine of the motor-vehicle, attachment holes 50 created directly on the band 13 are formed. Also in the embodiment of the invention illustrated in FIG. 6, at the second end 5 intended to be connected to the engine of the motor-vehicle, attachment holes 50 created directly on the band 13 are formed that, in this case, does not have any twisted portion.

Still with reference to the embodiment of FIGS. 2 and 3, the elastic device presents—at its first end 3—a plate 16 of metal and/or composite material having a main plane substantially perpendicular to the longitudinal direction of the motor-vehicle and a dowel of elastomeric material 17 arranged adjacent to the plate 16.

In FIG. 2, the metal plate 16 and the adjacent dowel 17 are connected to a wall 9 of the structural connecting element 2 of a motor-vehicle.

According to a characteristic of the invention, the elastic device is connected to the structural connecting element 2 by means of a respective connecting device 20 mounted outside the structural connecting element 2, without the need for providing a connection of the first end 5 of the device through an opening of a wall of the structural connecting element (as illustrated in FIG. 1 relative to the prior art). Still with reference to FIGS. 2 and 3, the plate 16 and the dowel of elastomeric material 17 are provided with respective coaxial holes 19 for receiving respective threaded connections that can be coupled to respective bolts 20, pre-welded on the wall 9 of the structural connecting element 2. Of course, the connecting devices can be produced in a different manner with respect to that shown in FIG. 2.

In FIGS. 4 and 6, further embodiments of an elastic device according to the present invention are illustrated. In these embodiments, the band 13 comprised between the second end 5 and the portion, with a serpentine wavy conformation of the metal body 1, is in the form of a straight band, without providing the previously described twisted portion 14.

In this embodiment, the number of the loops 10 is reduced with respect to the embodiments of FIGS. 2, 3 and 5. A central loop 100 has an element of elastomeric material 11 at its concavity, having a plurality of holes 110 of different sizes. A first loop 111 near the first end 3 has an element of elastomeric material 11 at its concavity, having a slot 112. A second loop 113 near the band 13 has an element of elastomeric material 11 at its concavity, having a hole 114 with a greater extension with respect to the holes 110.

Furthermore, again with reference to the embodiments illustrated in FIGS. 4 and 6, a plate 16 is also arranged at the first end 3, having a main plane substantially perpendicular to the aforesaid longitudinal direction. Unlike the embodiments illustrated in FIGS. 2, 3 and 5, in this case, the first end 3 does not have a dowel of elastomeric material arranged adjacent to the metal plate 16. In this case, the plate 16 is also intended to be connected to a wall of a structural connecting element of a motor-vehicle, by means of threaded connections arranged within the holes 19 formed on the plate 16. In the embodiments of FIGS. 4 and 6, the plate 16 is formed as an end part of the aforesaid first loop 111, while in the embodiments shown in FIGS. 2, 3 and 5, the plate 16 is rigidly connected to the loop 10 arranged adjacent to the plate 16.

FIGS. 7-8 illustrate a fifth embodiment of an elastic device according to the present invention. In this embodiment, there is a seat at the first end 3 for receiving a respective elastic bushing 21 having a main axis directed in a direction transverse to the longitudinal direction of the elastic device. Consequently, the bushings 21 and 15 of the first end 3 and of the second end 5, respectively, have axes substantially parallel to each other.

As illustrated, in particular, in the cross-sectional view of FIG. 8, in this embodiment, the first end 3 is connected to a bracket 22 welded to a wall 9 of the structural connecting element 2. The bracket 22 has two protruding portions having a respective hole arranged to receive a threaded connection 23 for attaching the first end 3 and, therefore, the bushing 21 to the structural connecting element 2.

FIGS. 9-10 illustrate a sixth embodiment of an elastic device according to the present invention. In this embodiment, the first end 3 comprises a plate 24 having a main plane substantially parallel to the longitudinal direction of the motor-vehicle and of the elastic device. As illustrated, in particular, in the partially cross-sectional view of FIG. 8, the plate 24 is intended to be connected to an upper wall 25 of a structural connecting element 2 of a motor vehicle. Of course, the plate 24 can be connected to the structural connecting element 2 in different ways than that illustrated. The plate 24 is provided with holes 26 formed to allow connection of the device to the element 2 by means of threaded connections 27.

According to an important characteristic of the invention illustrated, in particular, in FIGS. 4, 11 and 12, the elastic device further comprises an extension cable 30 made, for example, of metal. The extension cable 30 extends along the metal body 1 of the device, and is passed through the loops 10 and the elements of elastomeric material 11. As illustrated in particular in FIGS. 9 and 10, the cable 30 has a first cable end 31 (see FIG. 12) and a second cable end 32. The second cable end 32 is free, and arranged near the band 13 of the device. The free second cable end 32 includes an element made of elastomeric material 33, specifically in the form of a stroke-end cylinder to limit the elastic deformation of the main body 1 of the device. The first cable end 31 is constrained to the metal body 1 and is held at the elements 16 and 17, while the opposite second cable end 32 is free.

Thanks to the characteristics indicated above, the extension cable 30 allows limitation of the elongation of the device 1 in tension, following a high stress in the longitudinal direction, which could cause malfunctions of the elastic device.

In particular, FIGS. 13A-13C also illustrate the operating steps of the elastic device during use of the motor-vehicle. FIG. 13A illustrates the elastic device in a tension condition due to a stress in the longitudinal direction. With reference to FIG. 13B, a normal condition is illustrated for assembly of the device connected to the structural connecting element and to the engine of a motor-vehicle. With reference to FIG. 13C, a compression configuration of the device is illustrated, following a longitudinal stress in the opposite direction with respect to the condition illustrated in FIG. 13A. As evident from the drawings, the body 1 and the loops 10, as well as the elements of elastomeric material 11, deform as a result of the stress in the longitudinal direction.

Thanks to the characteristics indicated above, the elastic device according to the present invention achieves a series of important advantages.

Firstly, the elastic device is produced with a simple structure and low production-cost.

Secondly, the durability performance of the elastic device is considerably improved with respect to known types of devices, as a result of the conformation of the body of metal and/or composite material, and the arrangement of the elements of elastomeric material.

Finally, the elastic device can be easily implemented on motor-vehicle architectures of different types, and is easily adaptable according to the nominal loads to which it is subjected by the choice of material, shape and arrangement of the loops, and shape and arrangement of the elements of elastomeric material.

Of course, without prejudice to the principle of the invention, the details of construction and the embodiments may vary widely with respect to those described and illustrated purely by way of example, without departing from the scope of the present invention.

What is claimed is:

1. A motor-vehicle comprising:
   a structural connecting element rigidly connected to a front portion of a platform,
   an engine elastically supported on a structure of the motor vehicle,
   an engine suspension elastic device elongated in a direction substantially parallel to a longitudinal direction of said motor-vehicle,
   said motor-vehicle engine suspension elastic device having a first and a second end, said first end connected to said structural connecting element, and a second end connected to said engine, in such a way that, during operation of said motor-vehicle, said engine suspension elastic device reduces the stresses to which said engine is subjected in the longitudinal direction of the vehicle,
   said motor-vehicle engine suspension elastic device having a main body of metal and/or composite material comprising at least one portion elastically deformable in said longitudinal direction with a serpentine wavy conformation defining a plurality of loops with concavities alternately facing in opposite directions, in such a way that said body portion is able to be elastically deformed in said longitudinal direction,
   said body of metal and/or composite material being provided with a number of elements of elastomeric material, each element of elastomeric material being received and vulcanized within the concavity of a respective loop of said elastically deformable portion, for providing elastic and shock-absorbing functions,
   said elements of elastomeric material having at least one hollow portion, to modulate the stiffness of said device.

2. The motor-vehicle of claim 1, wherein said main body of metal and/or composite material in the portion comprised between said second end and said elastically deformable portion, with a serpentine wavy conformation, is in the form of a straight band.

3. The motor-vehicle of claim 1, wherein a seat provided for receiving an elastic bushing of elastomeric material, having a main axis directed in a direction substantially transverse to said longitudinal direction, is arranged at said second end.

4. The motor-vehicle of claim 1, wherein holes are formed at said second end, arranged for connecting an elastic bushing of elastomeric material intended to be directly connected to said engine.

5. The motor-vehicle of claim 3, wherein said band is twisted.

6. The motor-vehicle of claim 1, wherein said elements of elastomeric material have at least one hollow portion, to modulate the stiffness of said device.

7. The motor-vehicle of claim 1, wherein said elastic device has a seat at said first end, provided to receive a respective elastic bushing having a main axis directed in a direction transverse to the longitudinal direction of said elastic device.

8. The motor-vehicle of claim 1, wherein said first end comprises a plate of metal and/or composite material, having a main plane substantially perpendicular to said longitudinal direction.

9. The motor-vehicle of claim 1, wherein said first end comprises a metal plate having a main plane substantially parallel to said longitudinal direction.

10. The motor-vehicle of claim 8, wherein said metal plate is arranged with at least one hole for receiving a respective connecting device.

11. The motor-vehicle of claim 1, wherein said elastic device further comprises an extension cable extending along the metal body of said device, and passing through said loops and said elements of elastomeric material, said cable having a first cable end connected to said first end of said device and a free second cable end including an end-stroke element of elastomeric material for limiting the elastic deformation of said metal body.

12. The motor-vehicle of claim 1, wherein said first end of said elastic device is connected to said structural connecting element by means of a respective connecting device mounted outside said structural connecting element, without the need to provide a connection of said first end through an opening of a wall of the structural connecting element.

13. The motor-vehicle of claim 12, wherein said first end of said elastic device is connected to a vertical wall of said structural connecting element of a motor vehicle.

14. The motor-vehicle of claim 12, wherein said connecting device comprises at least one threaded connection, which can be coupled to a respective connecting device on a wall of said structural connecting element.

15. A motor-vehicle engine suspension elastic device comprising:
   a main body of metal and/or composite material substantially elongated in a direction substantially parallel to the longitudinal direction of said motor-vehicle;
   a first and a second end, wherein said first end can be connected to a structural connecting element of a motor-vehicle, and a second end can be connected to said engine of said motor-vehicle;
   said main body of metal and/or composite material comprising at least one portion elastically deformable in said longitudinal direction;
   said at least one elastically deformable portion having a serpentine wavy conformation,
   said first end comprising a plate of metal and/or composite material, having a main plane substantially perpendicular to said longitudinal direction; and
   said first end comprising a dowel of elastomeric material arranged adjacent to said plate.

16. A motor-vehicle engine suspension elastic device comprising:
- a main body of metal and/or composite material substantially elongated in a direction substantially parallel to the longitudinal direction of said motor-vehicle;
- a first and a second end, wherein said first end can be connected to a structural connecting element of a motor-vehicle, and a second end can be connected to said engine of said motor-vehicle;
- said main body of metal and/or composite material comprising at least one portion elastically deformable in said longitudinal direction;
- said at least one elastically deformable portion having a serpentine wavy conformation,
- said first end comprising a plate of metal and/or composite material, having a main plane substantially perpendicular to said longitudinal direction; and
- said plate and said dowel of elastomeric material comprising respective coaxial holes arranged to receive respective connecting devices.

17. A motor-vehicle engine suspension elastic device comprising:
- a main body of metal and/or composite material substantially elongated in a direction substantially parallel to the longitudinal direction of said motor-vehicle;
- a first and a second end, wherein said first end can be connected to a structural connecting element of a motor-vehicle, and a second end can be connected to said engine of said motor-vehicle;
- said main body of metal and/or composite material comprising at least one portion elastically deformable in said longitudinal direction;
- said at least one elastically deformable portion having a serpentine wavy conformation, said at least one elastically deformable portion defining a plurality of loops with concavities alternately facing in opposite directions;
- at least one elastically deformable portion of the main body of metal and/or composite material associated with one or more elements of elastomeric material having elastic and shock-absorbing functions;
- each of said elements of elastomeric material vulcanized to a respective loop of said serpentine portion; and
- an extension cable extending along the metal body of said device, and passing through said loops and said elements of elastomeric material, said cable having a first cable end connected to said first end of said device and a free second cable end including an end-stroke element of elastomeric material for limiting the elastic deformation of said metal body.

\* \* \* \* \*